United States Patent
Li et al.

(10) Patent No.: US 6,473,830 B2
(45) Date of Patent: *Oct. 29, 2002

(54) SYSTEM AND METHOD FOR ORGANIZING DATA STORED IN A LOG STRUCTURED ARRAY

(75) Inventors: Juan Li; Dung Kim Nguyen, both of San Jose; Aare Onton, Saratoga; Kevin Frank Smith, Morgan Hill; Hai-Fang Yun, San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/846,148

(22) Filed: Apr. 30, 2001

(65) Prior Publication Data

US 2002/0032835 A1 Mar. 14, 2002

Related U.S. Application Data

(63) Continuation of application No. 09/092,433, filed on Jun. 5, 1998, now Pat. No. 6,256,705.

(51) Int. Cl.[7] .......................... G06F 12/00; G06F 13/00
(52) U.S. Cl. ....................... 711/112; 711/114; 711/154; 711/170
(58) Field of Search ............................. 711/3, 112, 113, 711/114, 118, 136, 154, 170; 365/189.01

(56) References Cited

U.S. PATENT DOCUMENTS

| | | | |
|---|---|---|---|
| 5,416,915 A | 5/1995 | Mattson et al. | 395/441 |
| 5,418,921 A | 5/1995 | Cortney et al. | 711/114 |
| 5,488,701 A | 1/1996 | Brady et al. | 395/182.04 |
| 5,530,850 A | 6/1996 | Ford et al. | 395/600 |
| 5,537,588 A | 7/1996 | Englemann et al. | 395/605 |
| 5,551,003 A | 8/1996 | Mattson et al. | 395/463 |
| 5,551,020 A | 8/1996 | Flax et al. | 395/600 |
| 5,574,952 A | 11/1996 | Brady et al. | 395/888 |
| 5,581,724 A | 12/1996 | Belsan et al. | 395/441 |
| 5,650,969 A | 7/1997 | Niijima et al. | 365/200 |
| 5,682,499 A | 10/1997 | Bakke et al. | 711/112 |
| 5,787,460 A | 7/1998 | Yashiro et al. | 711/114 |
| 5,893,139 A | 4/1999 | Kamiyama | 711/117 |

OTHER PUBLICATIONS

"Method for Improving the Host I/O Performance during Concurrent Copy": IBM TDB, vol. 37, No. 02A, Feb. 1994, pp. 481–482.

"Reducing Data Movement in Log Structure File System Garbage Collection": IBM TDB, vol. 38, No. 02, Feb. 1995, pp. 322–326.

Primary Examiner—Tuan V. Thai
(74) Attorney, Agent, or Firm—Randall J. Bluestone

(57) ABSTRACT

In a storage system comprising an array of storage devices, including a processor and memory, a plurality of logical tracks are organized on the storage devices in segments comprising columns striped across the storage devices. A system and method are provided for storing logical tracks in the storage devices. Sequentially logically related logical tracks are stored together in neighborhoods. Logical tracks of the same neighborhood destaged at the same time are assigned to a single open segment with other logical tracks of the same neighborhood type. The time at which open segments are designated as closed segments to be written to the storage devices is based on performance, disk utilization and memory utilization criteria. Logical tracks are never split between segment columns. Also, attempts are made not to split a neighborhood of logical tracks being destaged together between segment columns.

12 Claims, 5 Drawing Sheets

| LSA Directory | | | | | | | |
|---|---|---|---|---|---|---|---|
| LOG VOL ID | LOG Track ID | SEG ID | SEG Column | Offset | Length | Age | Status | Activity |
| VOL 2 | 200 | SEG 4 | COL 3 | 20 | 30 | 12345 | Idle | 2/Day |
| VOL 2 | 201 | SEG 26 | COL 8 | 1 | 5 | 21845 | G. C. | 1/Hr |
| ... | ... | ... | ... | ... | ... | ... | ... | ... |

| Open Segment Listing | | | | | | |
|---|---|---|---|---|---|---|
| Segment ID | Passed Over Count | Free Space | Segment Type | Number of LTs | Post Split PO Count |
| SEG 1 | 1 | 100 Sec | Hot | 30 | 0 |
| SEG 3 | 3 | 20 Sec | Cold | 4 | 0 |
| SEG 20 | 0 | 5 Sec | Cold | 15 | 0 |
| SEG 400 | 3 | 300 Sec | Hot | 400 | 1 |

FIG. 3

SYSTEM AND METHOD FOR ORGANIZING DATA STORED IN A LOG STRUCTURED ARRAY

CROSS REFERENCE TO RELATED APPLICATION

This is a continuation of application Ser. No. 09/092,433, filed Jun. 5, 1998, Patent No. 6,256,705.

FIELD OF THE INVENTION

This invention relates to a storage system comprising an array of storage devices where data blocks are arranged as a log structured array. More particularly, this invention relates to arranging data blocks into segments stored in the log structured arrays for optimal performance.

BACKGROUND OF THE INVENTION

A disk array is a collection of hard disk drives (HDDs) managed as a unit. Disk arrays can provide better data I/O rate and data availability for application programs than single large capacity disks.

In "A Case for Redundant Arrays of Inexpensive Disks" report no. UCB/CSD/87/391, December 1987, Patterson et al. defined five levels of RAID. In each RAID level, redundant information is provided so that if one of the HDDs is unavailable, the data on that HDD can be reconstructed from one or more of the other HDDS in the array. RAID-1, often referred to as disk mirroring or data duplexing, stores identical images of user data on two or more member HDDS. In the RAID level 3, 4 and 5 systems, redundancy is provided through a parity technique.

In RAID level 4 and 5 systems, blocks of data are stored on each HDD in the array, and parity is calculated based on a group of blocks of data on each disk drive. A parity stripe or segment consists of a set of corresponding data blocks on each disk drive and a parity block calculated from those data blocks. Data can be striped at many levels, by blocks, tracks, multiple tracks, cylinders, and so forth. In RAID-5, parity is rotated amongst all the disk drives which makes the workload on the disks in the array uniform. Other RAID levels are also known including RAID-0 where data is striped on a set of HDDs but the array does not include any parity or other redundant information.

Customers of storage arrays are most concerned with reliability, access times, and cost per megabyte of data stored. RAID systems provide a way of addressing the reliability issue at the lowest disk cost. Access time is improved by caching data. A cache is a random access memory often included as part of a storage subsystem to improve access time. A cache stores information that either has recently been requested from the disk or that needs to be written to the disk.

Data compression techniques provide a solution for improving the cost per megabyte of data storage even further. However, there are problems with implementing compression in RAID systems where data is always stored in the same location (home address) if it continues to be modified. Although a good compression algorithm yields space savings in general, the amount of compression achieved is dependent on the actual data values. After a piece of data is updated it may not compress as well as it did before it was updated so it may not fit back into the space that had been allocated for it before the update. This creates a problem for any storage system where data is assigned a home address.

In a RAID level 5 system, parity information is updated for a write operation from the logical combination of the old data, the new data, and the old parity. While RAID-5 provides many benefits for increasing concurrent accesses, a write penalty is incurred. Rather than only having one array access for writing the new data, a write operation in RAID 5 requires four array access operations, for reading the old data, reading the old parity, writing new data and writing new parity.

In Rosenblum et al, "The Design and Implementation of a Log Structured File System," Proceedings of the 13th ACM on Operating System Principles, October 1991, a log structured file system was proposed where modified data blocks are written to the disk sequentially in a log-like structure. Information is also written with each write operation about the data being written. This information is used in managing the system.

A log structured array (LSA) uses some of the same principles of a log structured file in an array system. There are many benefits to using an LSA over a home address based RAID system. An LSA can accommodate the size changes in data produced through data compression since data is not given a fixed location on the disk. Therefore, in an LSA, data can be stored on disks in a compressed form. Also, since an LSA writes all modifications to disk sequentially in a log like structure, it solves the RAID-5 write penalty problem described previously. There is no longer a need to read the old data and old parity, since data blocks for an entire segment are written together.

Application programs running on a host computer read and write data using logical devices independent of the physical location of the data on a storage device. The application program accesses the data from the storage system using logical cylinder, logical head, and logical record addresses. The storage system controller translates the logical address to the physical address at which the data is stored. The host computer is unaware of the manner in which requested data is accessed from the physical storage devices. The typical unit of data management within the controller is a logical track. A combination of a logical cylinder and logical head address represent the logical track address.

The log structured array consists of N+P+S physical disk drives, where N is the number of HDDs worth of physical space available for customer data, P is the number of HDDs worth of physical space for parity data, and S is the number of HDDs worth of physical space for spare drives. Each HDD is divided into large consecutive areas called segment columns. Typically, a segment column is as large as a logical cylinder. Corresponding segment columns from the N+P+S HDDS constitute a segment. The array has as many segments as there are segment columns on a HDD disk in the array. An example of the layout for such a system is. shown in FIG. 2. In a RAID-5 configuration, one of the segment columns of a segment contains the parity of the remaining data segment columns of the segment.

One of the most important benefits of an LSA is its ability to store more data with the same amount of physical disk space. Compression (using an algorithm to shorten the physical length of the data) and compaction (organizing the storage of the data efficiently in the space provided) are the two crucial factors to make this possible. It is desirable to effectively compact the data-stored in the LSA storage space in order to make efficient use of the storage space.

Logical tracks of data are mapped to physical locations in segments. Segments have a predetermined set size while logical tracks have variable sizes due to compression. Therefore each segment holds an integer number of logical tracks and possibly wasted space in which no logical tracks fit. The packing factor refers to the fraction of the available storage space that is occupied by customer data. There is a need to increase the packing factor (increase effective storage capacity) by minimizing the amount of wasted space in the storage system. In particular, the system for assigning logical tracks to segments (referred to as a "filling algorithm") affects the packing factor for the system. An efficient system for assigning logical tracks to segments provides for better disk utilization which increases effective disk capacity and provides a lower cost per megabyte of storage.

It is also desirable to increase the performance of sequential read operations. An LSA does not update logical tracks in place, but rather assigns updated logical tracks to new locations. Over time, tracks that are logically consecutive may be physically scattered over the array unless such tracks are updated at the same time. Thus, one of the drawbacks of a log-structured system is the performance degradation of sequential reads of logically adjacent tracks that were not written sequentially. Such read operations require multiple disk head seeks in a log-structure system, compared to one seek in a traditional update-in-place (home address) system. Therefore, there is a need for organizing data for better performance during sequential reads.

One or more of the foregoing problems is solved, or one or more of the foregoing goals is achieved using the current invention.

SUMMARY OF THE INVENTION

It is an object of this invention to increase the effective storage capacity of the storage system in terms of compression and compaction.

It is a further object of this invention to increase the performance of sequential reads in a log structured array by storing logically consecutive data blocks together as much as possible.

It is a further object to provide an efficient system for assigning logical tracks to segments in a log structured array to improve performance and optimize storage capacity.

In a storage system comprising an array of storage devices, including a processor and memory, a plurality of logical tracks are organized on the storage devices in segments striped across the storage devices in columns. A system and method are provided for storing logical tracks in the storage devices. Sequential logical tracks are grouped together in neighborhoods. Logical tracks of the same neighborhood that are ready to be written (destaged) to the storage devices at the same time form a neighborhood in destage and are assigned to a single segment. The segment is designated to be written to the storage devices based on performance criteria, where logical tracks are not split between segment columns, neighborhoods in destage are not split between segments and an attempt is made to not split neighborhoods in destage between segment columns. Also, segments are not kept in memory too long before being written to the devices.

In a further preferred embodiment an article of manufacture is provided for use in storing and managing a plurality of sets of logical tracks in a computer system having a processor, memory and a group of storage devices. Each set of logical tracks is stored in a segment striped across the group of storage devices. The article of manufacture has a computer program code embodied in said medium which causes the computer system to perform steps for organizing the storage of the logically related logical tracks together in the same segment.

BRIEF DESCRIPTION OF THE DRAWINGS

FIG. 3 is a diagram of the control structures used in the preferred embodiment of the invention.

DETAILED DESCRIPTION OF THE PREFERRED EMBODIMENT

Figure 1:
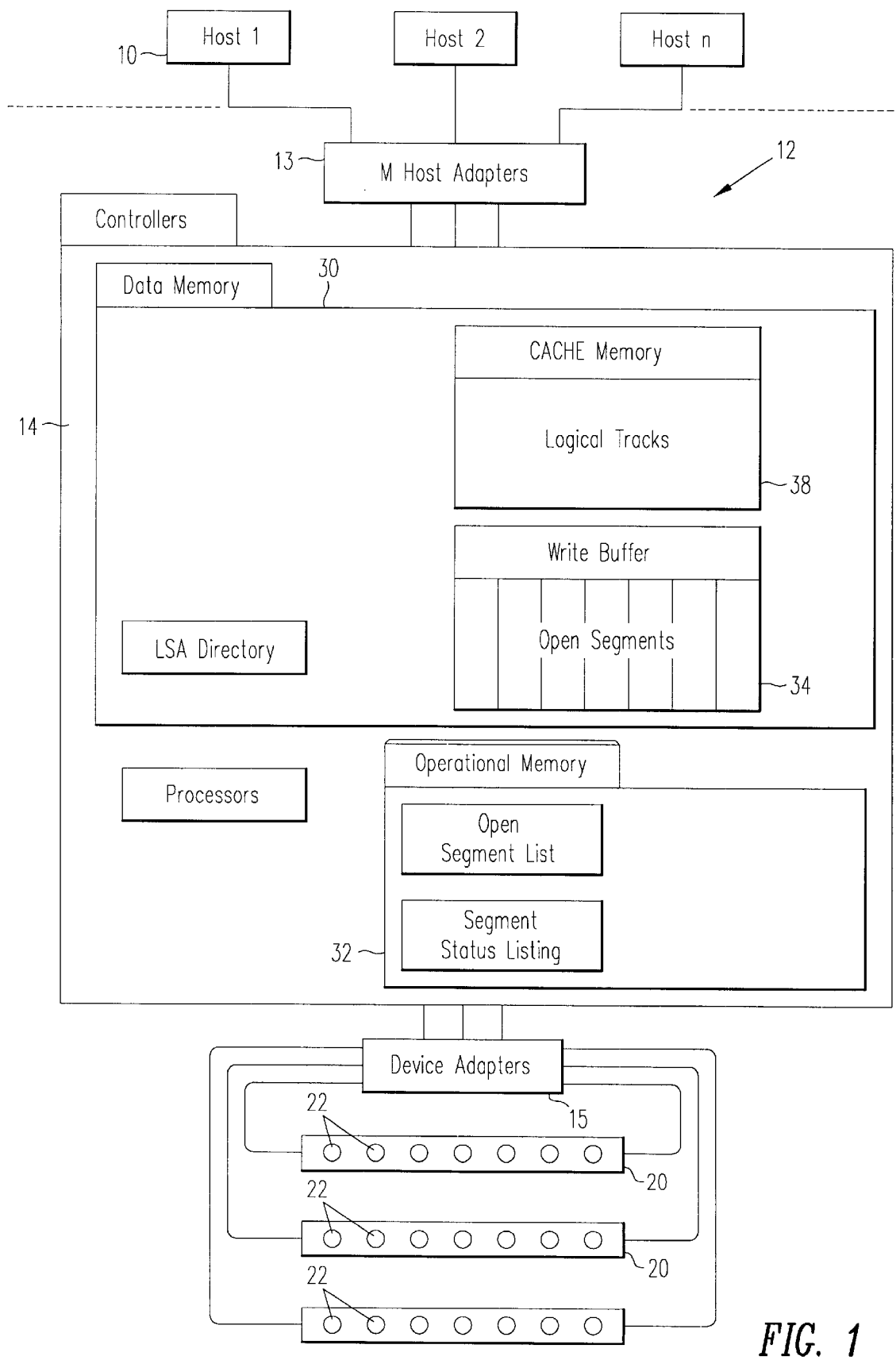
FIG. 1 is a block diagram of a computer system that includes a log structured array and array controller in accordance with the preferred embodiment of the present invention.

Referring to FIG. 1, one or more host processors 10 are connected to an external storage sub-system 12 through one or more-host adapters 13. The storage subsystem 12 comprises the host adapters 13, the controllers 14, device adapters 15 and arrays of storage devices 20.

Preferably a multi-nodal data storage system is used, in a multi-nodal data storage system, a data storage controller has multiple nodes, each of the nodes may comprise, for example, an Intel model I960 microprocessor. The multi-processing nodes are interconnected in a torus ring configuration. A lower interface (LI) node executes microcode that manages the disk arrays 16, including an LSA partition. The LSA subcomponent of the LI manages the LSA. A cache node manages the cache memory. The LI node and cache node can be the same physical entity, where microcode running at the same node performs the different functions.

A pair of LI nodes can provide shared management. A first node may operate a series of storage devices 1 through 8, while a second would operate storage devices 9 through 16. In the case that the first node fails the second node can take over for the failed node and vice versa. The storage devices may be reassigned from one node to another to balance the nodes workload as well. Alternatively, each node is assigned exclusive control over a selected group of storage devices.

The controllers 14 are connected to the disk drives through one or more device adapters 15. Each device adaptor communicates with at least one disk array 20 comprising a set of N+P+S disk drives 22. Preferably, each disk array is a separate parity group, or an integer number of parity groups, where the parity stored in the group of HDDs is used for reconstructing the data in the same parity group.

Each host 10 comprises at least one processor to execute the system and application code, memory to hold system code, application code and data, and an I/O system responsive to Read and Write calls from executing applications for accessing information not in memory, from the external storage.

The present invention may be applicable to a variety of host computers under a number of different operating systems. The host computer may for example be a personal computer, a server, or a main frame computer. In addition, the computer may be a stand alone system or a part of a network such as a local area network or a wide area network.

An example of a host system is the IBM System/370 or IBM System/390 running the IBM MVS operating system. Alternatively, the host system may be, for example, an IBM RS/6000 system running the IBM AIX operating system or any combination thereof. In an MVS system, the host processor creates a dedicated virtual processor for accessing and transferring data over a demand response interface to attached subsystems using chains of special purpose I/O instructions called channel command words (CCW). When an application program executes a Read or Write command requiring access to external storage such as disk storage, the MVS operating system issues a start I/O command. The start I/O command causes a CPU to suspend its multi-processing state, transfer data to the CCW chain and reestablish its prior state after the CCW chain completion. The host sends a CCW chain to the controller over a path, such as the ESCON path or the serial storage architecture (SSA) path.

In an LSA system, the storage controller interprets each of the CCWs and responsively applies counterpart control and address signals over a path to an LSA directory to ascertain the location of data on a disk array.

The CPU within the LSA controller executes program instructions that are stored in the operational memory. These instructions may be loaded into the operational memory through an optional program storage reader. The invention may be implemented using any combination of computer programming software, firmware, or hardware. As a preparatory step in practicing the invention or constructing the apparatus according to the invention, the computer programming code, whether software or firmware, according to the invention will typically be stored in one or more machine readable storage devices, such as a fixed hard drive, diskette, optical disk, magnetic tape, semiconductor memory, such as ROMS, P-ROMS, etc., thereby making an article of manufacture according to the invention. The article of manufacture containing the computer programming code is used by either executing the code directly from the machine readable storage device by copying the code from the storage device into another storage device such as a hard disk, RAM, etc. or by transmitting the code on a network for remote execution. The method form of the invention may be practiced by combining one or more machine readable storage devices containing the code according to the invention with appropriate standard computer hardware to execute the code contained therein. An apparatus for practicing the invention can be one or more computers in storage systems containing or having network access to computer programming code according to the invention.

With reference to FIG. 1, the controller for the LSA system-includes data memory 30 and operational memory 32. The data memory includes a write buffer 34 (consisting of a number of open segments), an LSA directory and cache memory 38. The cache memory has substantially larger storage capacity than the write buffer. Typically, the write buffer has a storage capacity of at least two segments worth of data, while the cache memory has at least twice and often more than ten times the storage capacity of the write buffer. The cache memory may contain both "dirty" (updated) logical tracks, which are data received from the host computer, and "clean" logical tracks, which are unmodified data, the same as the corresponding data on the HDDs.

When data is sent to a storage system controller for storage the data is compressed and stored in the cache memory where the data might remain for some time. The part of the cache that contains dirty data is typically battery protected such that it acts as a non-volatile store. When a portion of the cache memory that is occupied by dirty tracks exceeds a predetermined threshold, then a dirty track and all logically adjacent tracks already in the cache buffer are written to the storage devices. Often a storage system controller will also include a cache memory directory, which keeps track of the most recently used and less recently used logical tracks.

While described with reference to HDDs, the invention is not limited to that type of storage device. A typical HDD 22 is a magnetic hard disk device which has multiple platters where data is recorded in concentric tracks on both surfaces of the platters. Conventionally the tracks are sequentially numbered from platter to platter within a single storage device. The first outer most track on a first platter is track 1.

Figure 2:
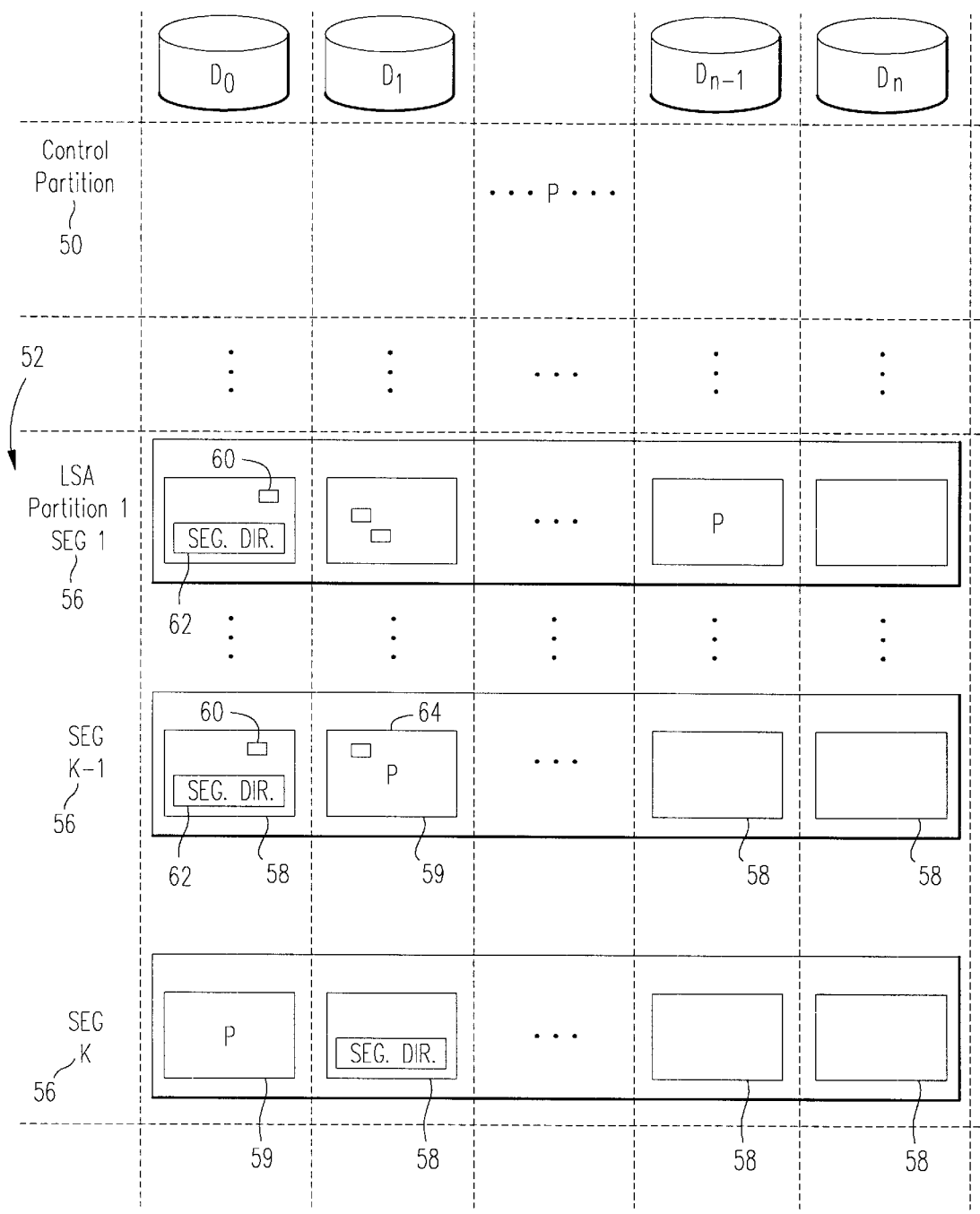
FIG. 2 is a representation of a layout of logical tracks in segments on a disk array according to the preferred embodiment of the invention.

Referring to FIG. 2, the storage is arranged as segments 56, where each segment has N data segment columns 58 and one parity segment column 59. The logical tracks 60 are stored within segment columns. A segment directory 62 contains information on each of the logical tracks in the segment which is used during garbage collection and recovery procedures. The segment directory 62 is stored in a small number of sectors out of the a segment's total disk space. As shown, the entire segment directory resides in one same segment column in each of the segments. Alternatively, the segment directory can be spread among the devices. In a RAID-5 system, parity is distributed among the devices as shown.

A segment column is defined as an arbitrary number of contiguous physical tracks as described above. Typically it is desirable to define a segment column to be the same size as a logical cylinder. The collection of disk recording areas comprising corresponding segment columns from each of the HDDs forms what is called a segment.

In order to improve response times for retrieving data from the disks, the total available LSA space is divided into two regions, hot and cold, based on the disk location. The segments in the hot region consist of physical tracks located close to the center of the disk platters which require less seek time. The segments in the cold region consist of physical cylinders farther away from the center of the disk platters. Each logical cylinder has an associated activity counter used as a measure of frequency of accesses to the logical cylinder. A logical cylinder that has a high activity count (active) is assigned to a segment in the hot region, thereby improving response time when accessing the data from disk.

LSA segments are categorized as one of the following:

FREE, meaning the segment contains no valid data and is ready to be opened;

OPEN, meaning the segment is available to hold logical tracks being written to disk (destaged) and is in the process of being filled with the logical tracks being destaged. Open segments are subtyped as destage open segments and garbage collection (GC) open segments. Each of these subtypes are further subtyped into hot region open segments and cold region open segments;

CLOSING, meaning no more destage data can be further assigned to it and it is in the process of being closed and written to disk; and CLOSED, meaning all of the data has been written to the disks.

The logical tracks in a logical cylinder may be destaged together to enhance the seek affinity of a sequential access. A logical cylinder is called a "neighborhood." Other groupings of logically sequential data may also be categorized as a neighborhood. The concept of a neighborhood is used to improve the seek affinity of sequential access patterns. The cache component, as part of its buffer management tasks, accumulates multiple write requests of logical tracks belonging to the same logical cylinder and submits such requests as one destage request. The amount of grouping the cache component can achieve depends upon the size of its buffer space. The LSA subcomponent tries to assign those logical tracks, referred to as a "neighborhood in destage," ("NID") to contiguous sectors within one segment column.

Destaging an NID involves assigning it to an open segment. The open segment remains available to accept other neighborhoods in destage (NIDs) until it is deemed full enough to close. All of the data blocks and parity that constitute a segment are written to a disk before the segment is considered closed. Each logical track in the open segment has an entry in a segment directory that describes the track's location in the segment. The segment directory is written on the disks as part of the segment at segment closing time.

Closed LSA segments written to the storage device have "live" tracks and "holes." Live tracks are tracks that were assigned to the segment while the segment was open (in the write buffer) and are still valid. Holes refer to the space vacated by tracks that were once assigned to the segment but subsequently were updated and assigned to a different open segment. Holes also develop when a segment is closed still having unassigned space.

Garbage collection is the process of reclaiming "holes" in closed segments on the storage devices. Garbage collection is started when the number of free segments falls below a certain threshold. Segments having a relatively low total number of sectors of valid data (occupancy) are identified for the garbage collection process.

The process of garbage collecting a segment involves reading the segment's directory from disk then scanning each directory entry and comparing the track's address as indicated by the entry with the address as indicated by the main LSA directory entry. If the two entries match, then the track still resides in the segment and is considered live. All the live tracks are then read from the disk into the memory segment buffer and sorted by neighborhood. These neighborhoods in destage then proceed to be destaged in the same manner as the ones destaged from cache. The LSA controller having a multi-tasking processor with significant memory, can perform garbage collection as a background process. When a segment's occupancy declines to zero, either as a result of garbage collection or as a result of movement of tracks from normal destage activity, the segment becomes a "free" or available segment.

The disk array storage space is divided into partitions. The controller creates a map representation of each partition, where each partition comprises a selected number of byte sectors, or tracks of each disk drive in the array. The controller receives a request to allocate a number of storage partitions, which also can be thought of as logical volumes, into the storage area. These requests may originate from the user input device or the host computer application. Each request includes a size and a function mode for each storage partition. Based on the request, the controller operates each storage partition as a logical volume according to the requested function mode. In an illustrative embodiment the function modes may include LSA, home address (HA), non-RAID, and various levels of RAID.

Referring to FIG. 2, a layout of the disk system is shown where there are N+1 drives, where N is the number of data drives. The total disk space of N+1 drives is partitioned for example as a control partition 50 and LSA partition 52. When an LSA partition is created its corresponding control partition is also created. The control partition is parity protected, but, is not log structured; data stored in a control partition is updated in place. The control partition is used for storing control structures used by the LSA that are not described here.

Referring to FIG. 3, the LSA directory 70 data structure has an entry for each logical track providing its physical address in an LSA partition. Each directory entry consists of the segment number 71, the segment column number 72 which is used to determine the drive ID, the offset within the segment column 73 in blocks, and the length of the logical track 74 in blocks. The LSA directory 70 is accessed using the logical volume ID 75 and the logical track ID 76 to provide a mapping to the physical storage location on the HDD, the drive ID and beginning block address (using the segment column and offset). Information logical track status 77, on whether it is being staged (read from disk) or destaged (written to disk) or garbage collected, when it was written (the age 78), and the frequency of accesses (the activity) 79 is also stored in the LSA directory.

Each neighborhood in destage (also referred to as an "NID" or as a destage request) sent to the LSA subcomponent, is assigned to an open segment. NIDs waiting for an assignment wait in an NID queue.

An LSA partition may have multiple open segments which can accept NIDs. An open segment pool list is maintained of each open segment providing information on the amount of free space left in each segment. Free space refers to the number of sectors in an open segment that are available for assignment to logical tracks. Free space does not include the sectors used for the segment directory.

The data structure shown in FIG. 3 at 105 is used for the open segment pool list. For each open segment, the following information is provided: the segment ID; the segment type (whether the segment contains frequently accessed (active) data to be stored in a hot region of the disks or it contains infrequently accessed (inactive) data to be stored in a colder region of the disks); the number of logical tracks in the segment; the "passed-over count" (PO count); the post split passed over count (post split PO count); and the amount of free space in the segment. Additionally, for each segment column, the amount of free space is listed (not shown).

The number of logical tracks (LTs) in a segment is monitored to ensure that the segment directory does not get too large. A maximum logical track limit (max LT limit) is defined for the system which determines the maximum number of LTs to be allowed in a segment.

The passed-over count (PO count) keeps track of the number of NIDs that the filling algorithm has unsuccessfully tried to place in an open segment. A passed-over count limit (PO count limit) is designated for the system. When a segment's PO count is greater than the PO count limit, an NID that does not fit into any single segment column in that segment is split between the segment's columns, if possible.

The post split passed over count (post split PO count) keeps track of the number of NIDs that could not be fit into the segment after an attempt was made to split an NID between segment columns. A post split PO count limit is defined for the system based on the system's requirements. When a segment reaches the post split PO count limit, the segment is closed and written to the appropriate location on the disks.

A closing threshold is defined for the system which is based on the percentage of assigned space in an open segment, above which an open segment is designated for closing. The closing threshold value is determined based on performance and packing factor criteria. The closing threshold can also be viewed as a percentage of free space below which the open segment is designated for closing.

An open segment limit is also defined for each open segment type (destage hot, destage cold, GC hot, GC cold) which is the maximum number of segments of that type at any one time to which NIDs can be assigned.

Figure 4A:
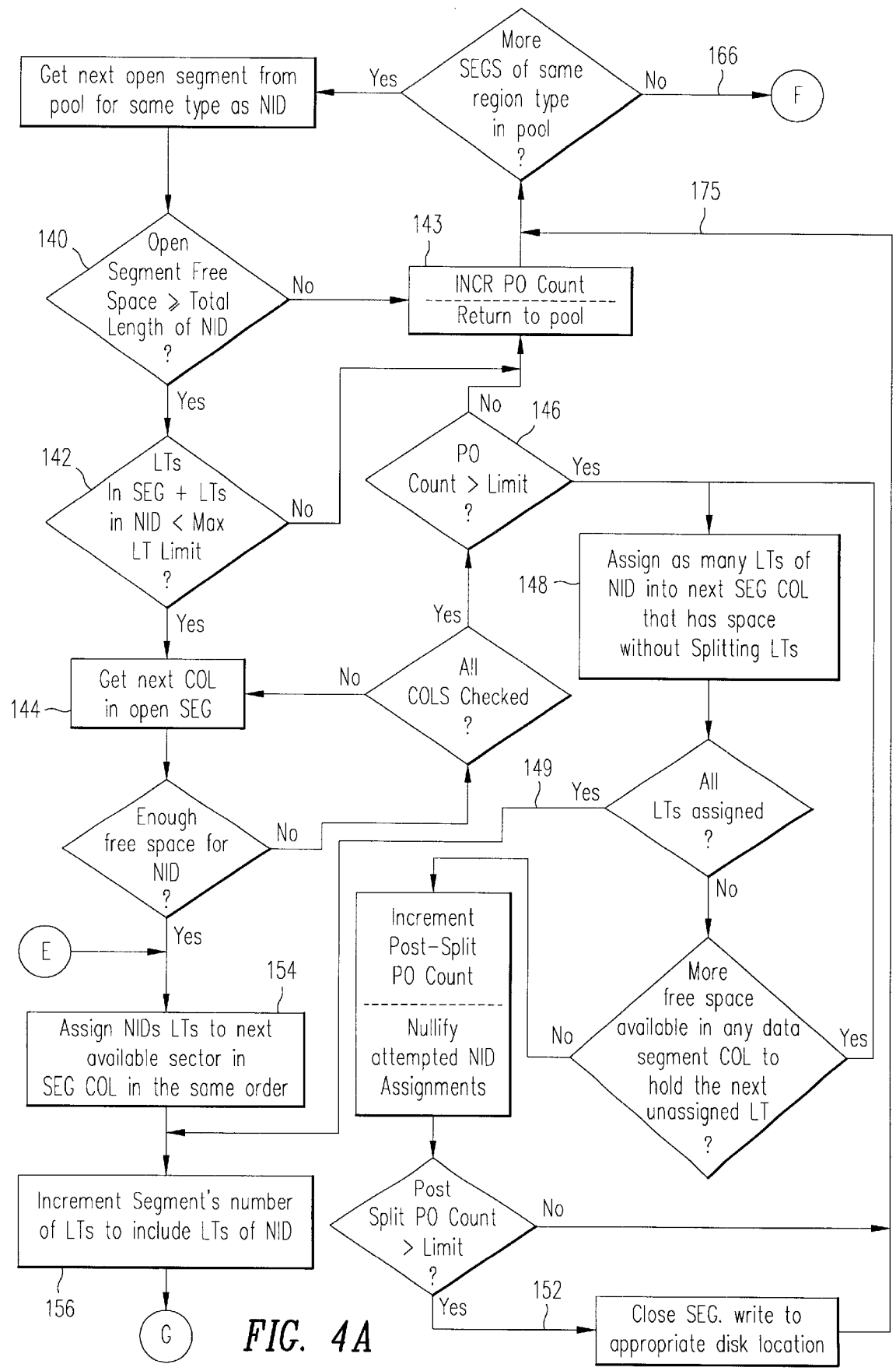
FIGS. 4A and 4B are the flow diagrams of the process for assigning logical tracks to segments.
Figure 4B:
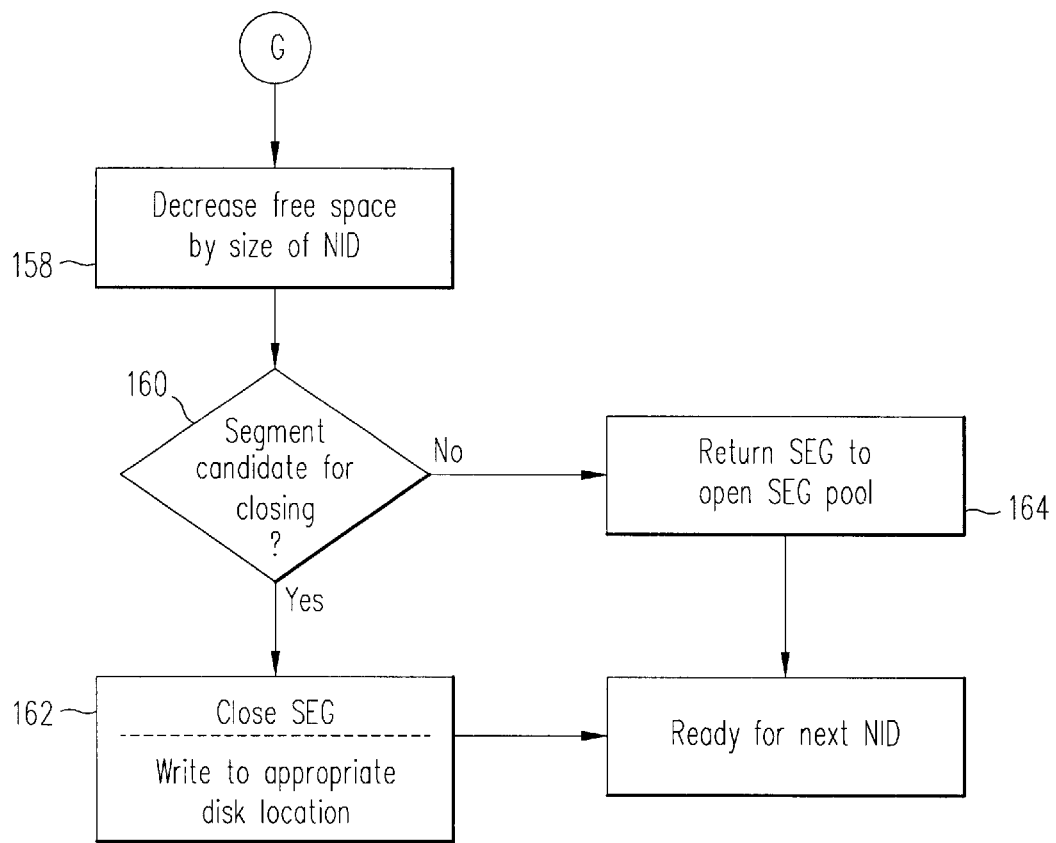
Figure 4B:
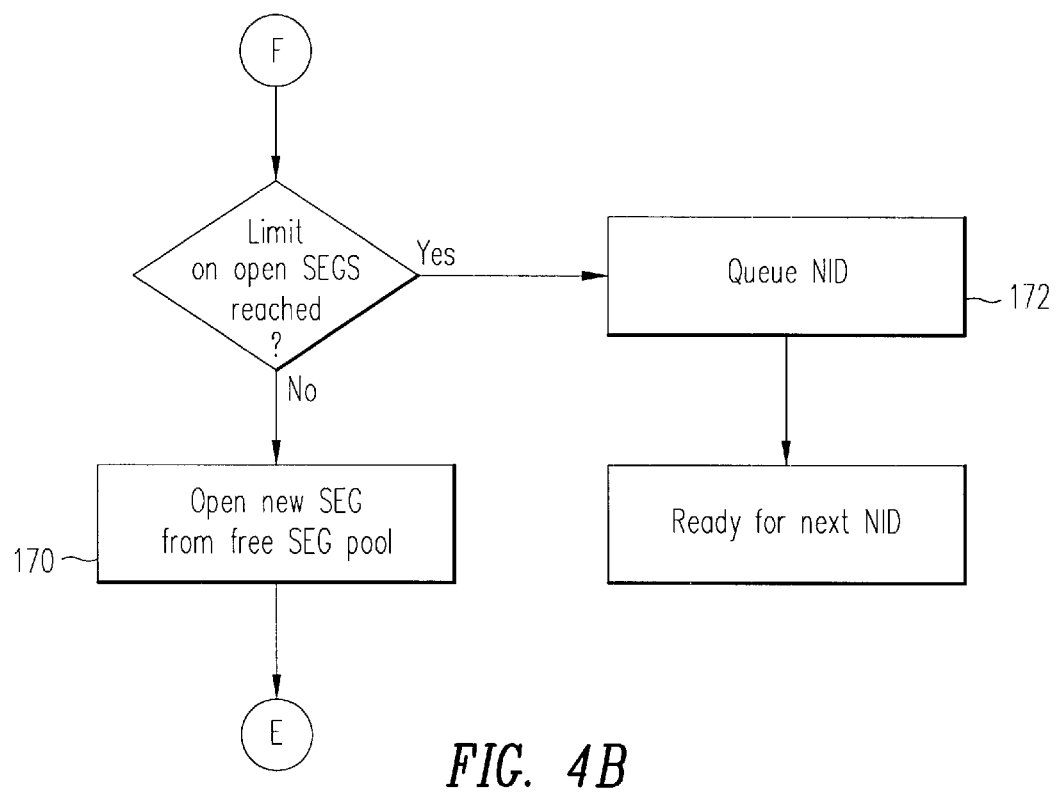

The system for assigning logical tracks to open segments for storage on the disk drives to make efficient use of the storage space (the "filling algorithm") will be described with reference to FIG. 4.

An open segment of the same region (active/hot or inactive/cold) and destage/GC activity type as the NID is selected whose total free space is at least as great as the sum of the lengths of the logical tracks in the NID 140. A determination is made as to whether the open segment would have too many logical tracks with the inclusion of the NID's logical tracks 142. The number of LTs in the selected open segment is added to the number of LTs in the NID. If this sum is greater than the max LT limit, the segment is not selected. If a segment does not have sufficient free space or the segment would have too many LTs, the segment's PO count is incremented and the segment is returned to the pool 143.

An attempt is made to store all LTs of an NID in a single segment column. Once a suitable open segment is identified its list of data segment columns is traversed, looking for the first segment column with enough free sectors to hold the entire NID 144.

If a segment column does not have enough free space to hold the NID in its entirety, the column is placed back at the end of the segment column list and the next column is inspected for sufficient space.

If a segment column has sufficient space, NID is assigned to the first available sector in the segment column, keeping the logical tracks in the same order in which the logical tracks were arranged in the NID 154. The segment column's free space is decremented accordingly.

After the LTs are assigned, the segment's counter of the number of LTs assigned to it is incremented to include the LTs of the NID 156 and the segment's free space is decremented to reflect the addition of the NID 158. A determination is made whether the open segment is a candidate for closing 160. A segment is a candidate for closing when the new assignment of NID LTs causes the segment's free space to decline below the closing threshold for the system or when the new assignment of NID LTs causes the number of LTs in the segment to equal the max LT limit. If the segment is a candidate for closing, then the segment is closed and written to the appropriate location on the storage devices for this neighborhood type (active/inactive) 162. If the segment is not a candidate for closing, it is returned to the open segment pool 164.

If an open segment does not have a segment column that can accommodate all the LTs of the NID, then it is determined whether the segment's PO count exceeds the PO count limit 146. If the PO-count limit has not been exceeded for that open segment, then the PO count for that open segment is incremented, the segment returned to the segment pool 143, and the search for a suitable open segment for the NID continues 175. If the PO count limit had been reached for that open segment, then the logical tracks of the NID are split among the segment columns of the open segment, if possible 148.

The NID may be split into two or more data segment columns through a splitting process as follows. As many logical tracks from the NID as can fit are assigned to the first listed data segment column that still has available free space. As many remaining logical tracks of the NID as can fit are assigned to the next data segment column in the list without splitting logical tracks between segment columns. This procedure is continued until either all the NID's logical tracks have been assigned 149, or the remaining free space in every data segment column cannot accommodate the next unassigned track 150. The latter case can occur because logical tracks are not being split. So, the total available segment space may be sufficient for the NID, but when assigning entire logical tracks to segment columns, sufficient space may not be available.

If the open segment does not have sufficient free space for the LTs, without splitting any LTs between segment columns, then the attempted assignments are nullified, the post split PO count is incremented for that open segment 150 and the process of finding a suitable open segment for the NID continues 175. If the open segment's post split PO count is greater then a pre-determined limit, the segment is designated for closing and is written to the appropriate location on the storage devices for that neighborhood type (active/inactive) 152.

If all of the LTs in the NID are successfully assigned to the segment 149, the segment's counter of the number of LTs assigned to it is incremented to include the LTs of the NID 156 and the free space is decremented to reflect the addition of the NID 158. A determination is made whether the open segment is a candidate for closing 160. If the segment is a candidate for closing, then the segment is written to the appropriate location on the storage devices for this neighborhood type (active/inactive) 162.

When an NID cannot be stored in any of the current open segments in the pool 166, the following procedure is followed: If the open segment limit has not been reached, a free segment is opened and the NID is stored in the newly opened segment 170. If no new free segments can be opened, then the NID goes back on the queue of NIDs to be destaged 172, and the NID is destaged at a later time.

Other NIDs requesting to be assigned may fit into the currently opened segments. Once a NID has failed to be assigned, it will not be considered for reassignment until after attempts are made to find a placement for the other NIDs waiting for assignment. This policy prevents the algorithm from spinning on the same NID, repeatedly attempting to assign the NID to the same open segments, and eventually forcing an open segment to close without permitting any other unassigned NIDs the opportunity to be placed in the segment.

The following criteria are used to determine when to close a segment: (1) if the free space in the segment is less than the closing threshold; (2) if the post-split PO count is greater than the post-split OC count limit; (3) if the number of LTs in the segment is equal to the max LT limit; and (4) if the segment's timer expires—When a segment is opened, a timer is set for that segment indicating a maximum time that the segment will be allowed to remain open.

The filling algorithm does not split a logical track across segment columns. And, it does not split a NID across open segments. Also, it does not re-sort the tracks of the NID during the splitting process in an attempt to find some satisfying assignment. Otherwise, the splitting process would have to try n! (where n is the number of logical tracks in the NID) orderings, which is a prohibitively expensive operation with marginal benefit.

The design of the filling algorithm described above provides flexibilities on making different tradeoffs based on priorities of different goals through some of the algorithm's parameters. There are tradeoffs that are considered between disk space utilization vs. memory utilization made through the open segment limit value and open segment's post-split passed-over count limit value.

The disk space utilization can be increased by having more segments open concurrently. The more segments that are allowed to be opened concurrently, the greater the possibility of finding a home for a NID among the currently opened segments, rather than opening a new segment. This option is controlled by the open segment limit. When setting the value, the trade-off between disk space utilization and buffer space utilization is considered. Since the data in a destage request sent from the cache component is not considered to be safely stored on disk until the open segment in which it is placed has completed the closing process, the data must be held in non-volatile cache memory for this entire period. Preferably the cache component even keeps two copies of the data for integrity purposes. Thus, the benefits of increasing the open segment limit must be balanced against the costs of using more cache buffer space to hold modified tracks and possibly reducing the memory available to hold frequently referenced read-only tracks. This option, therefore, also has implications for sequential read performance. Using the cache buffer for destage operations may cause the cache miss rate for stage operation to suffer, forcing those requests to be satisfied via disk accesses. In the preferred embodiment, the value of the open segment limit is two for each type of open segment.

Another way to increase disk space utilization is to keep segments open longer. The longer a segment remains open, the greater the possibility that some NID will fit into the remaining space. This option is controlled by the post-split PO count limit and closing threshold (as a maximum percentage of assigned space). Higher values for these limits allow the filling algorithm to try more NID assignments to an open segment before closing the segment. A lower closing threshold allows an open segment to close earlier, with more wasted space. A very high threshold value will most likely not delay the closing of a segment, since the post-split passed-over count will exceed the limit before threshold is reached. The cost/benefit analysis of cache space utilization vs. disk space utilization discussed previously also applies here, since the longer a segment remains open, the longer all of its NIDs hold the cache component's resources.

A balance between maximizing seek affinity vs disk space utilization can be achieved by incorporating a split limit. A split limit is used as the maximum number of fragments into which an NID may be split within a segment. The split limit allows the operation of the algorithm to be adjusted according to the relative priority of the goals. A split limit of zero (no splitting of NIDS) indicates that the performance of sequential read operations is critical enough to sacrifice some disk space. As an open segment fills up, the number of free sectors remaining at the end of the data segment columns shrinks, as does the probability that a NID will fit into just one column. A larger split limit value indicates a greater degree of tolerance for fragmenting NIDs and possibly incurring extra seeks during sequential reads in order to squeeze as much data into the remaining free space of each data segment column. The split limit can have a maximum value equal to the number of data segment columns in a segment. The split limit is used as a factor when splitting an NID. If the NID cannot be stored in the segment without passing the split limit, the assignment is considered unsuccessful, and the post-split PO count is incremented.

As has been described, the present invention provides an improved system and method for storing data blocks in segments in a log structured array. While the invention has been particularly shown and described with reference to a preferred embodiment it will be understood by those skilled in the art that various changes in form and detail may be made therein without departing from the spirit and scope of the invention.

We claim:

1. In a storage system comprising an array of storage devices, a processor and a memory having a plurality of logical tracks to be destaged to the storage devices in segments striped across the storage devices in columns, a method for storing logical tracks on the storage devices, comprising:

organizing related logical tracks in the memory to be written to the storage devices into neighborhoods in destage;

assigning each neighborhood in destage to a single open segment;

assigning each logical track to a single segment column;

attempting to assign each neighborhood in destage to a single segment column.

2. The method of claim 1 wherein logical tracks are assigned to the segment columns in the same relative order that the logical tracks are organized in the neighborhoods in destage.

3. The method of claim 1 further comprising:

designating for closing each open segment having reached a closing threshold percentage of assigned space;

designating for closing each open segment having a maximum number of assigned logical tracks;

designating for closing each open segment having had a duration threshold number of neighborhoods in destage unsuccessfully attempted to be stored in the segment; and designating for closing each open segment that has been open a maximum time limit.

4. A data storage system for storing electronic data for a data processing system, the data storage system comprising:

an array of storage devices, each storage device comprising a storage media for storing sectors of electronic data;

a plurality of neighborhoods in destage, wherein each neighborhood in destage comprises a set of related logical tracks in a memory to be destaged to the storage devices; and a plurality of segments striped across the storage devices in columns, wherein logical tracks of the same neighborhood in destage are assigned to a single segment and when possible all logical tracks of a neighborhood in destage are assigned to a single segment column.

5. The data storage system of claim 4 wherein logical tracks are assigned to the segment columns in the same relative order that the logical tracks are organized in the neighborhoods in destage.

6. The data storage system of claim 4 wherein:

open segments having reached a closing threshold percentage of assigned space are designated for closing;

open segments having a maximum number of assigned logical tracks are designated for closing;

open segments having had a duration threshold number of neighborhoods in destage unsuccessfully attempted to be stored in the segment are designated for closing; and open segments that have been open a maximum time limit are designated for closing.

7. A data storage system for storing electronic data for a data processing system, the data storage system comprising:

an array of storage devices;

a processor;

a memory, coupled to the processor and storage devices, the memory having a plurality of logical tracks to be destaged to the storage devices in segments striped across the storage devices in columns;

means for identifying an open segment with sufficient available free space to store a neighborhood in destage of logical tracks by traversing a list of open segments;

means for attempting first to store all of the logical tracks of the neighborhood in destage in the same segment column of the identified open segment;

means for determining when to split a neighborhood in destage between a plurality of segment columns when disk utilization and memory criteria are met;

means for writing to the storage devices a segment when the segment has a closing threshold number of sectors assigned to logical tracks; and means for writing to the storage devices a segment having a capacity threshold number of assigned logical tracks.

8. The data storage system of claim 7 wherein logical tracks are assigned to the segment columns in the same relative order that the logical tracks are organized in the neighborhoods in destage.

9. The data storage system of claim 7 wherein:

open segments having reached a closing threshold percentage of assigned space are designated for closing;

open segments having a maximum number of assigned logical tracks are designated for closing;

open segments having had a duration threshold number of neighborhoods in destage unsuccessfully attempted to be stored in the segment are designated for closing; and open segments that have been open a maximum time limit are designated for closing.

10. An article of manufacture for use in storing and managing a plurality of sets of logical tracks in a computer system having a processor, memory and a group of storage devices, wherein each set of logical tracks in the memory being destaged together to the storage devices is assigned to a segment striped across the group of storage devices in columns, the article of manufacture having a computer program code embodied in said medium which causes the computer system to:

update a logical track in a segment stored on the storage devices in a first location by writing the updated logical track as part of a different segment to a new storage location, wherein the logical track in the first location is designated an old data block and the logical track in the new location is designated a current logical track;

identify an open segment with sufficient available free space to store a neighborhood of logical tracks to be destaged by traversing a list of open segments;

attempt first to store all of the logical tracks of the neighborhood in destage in the same segment column of the identified open segment; and write an open segment to the storage devices having a threshold percentage of assigned logical tracks.

11. The article of manufacture of claim 10 wherein the computer program code embodied in said medium further causes the computer system to assign logical tracks to the segment columns in the same relative order that the logical tracks are organized in the neighborhoods in destage.

12. The article of manufacture of claim 10 wherein the computer program code embodied in said medium further causes the computer system to:

designate for closing open segments having reached a closing threshold percentage of assigned space;

designate for closing open segments having a maximum number of assigned logical tracks;

designate for closing open segments having had a duration threshold number of neighborhoods in destage unsuccessfully attempted to be stored in the segment; and designate for closing open segments that have been open a maximum time limit.

* * * * *